United States Patent [19]

Craig et al.

[11] 4,101,742

[45] Jul. 18, 1978

[54] AUDIO MESSAGE SYSTEM WITH PROGRAMMER

[75] Inventors: Edwin D. Craig, 3745 S. 250 West, P.O. Box 9255, Ogden, Utah 84409; Ruel Ross Clark, Salt Lake City, Utah

[73] Assignee: Edwin D. Craig, Ogden, Utah

[21] Appl. No.: 747,070

[22] Filed: Dec. 3, 1976

[51] Int. Cl.² .................. G11B 15/18; G11B 27/22; G11B 31/00

[52] U.S. Cl. .................. 179/100.1 C; 179/100.1 PS; 179/100.1 VC; 360/12

[58] Field of Search ............. 179/100.1 C, 100.1 PS, 179/100.1 VC, 100.1 R; 360/12, 69, 71, 72, 79; 346/20

[56] References Cited

U.S. PATENT DOCUMENTS

| | | | |
|---|---|---|---|
| 3,647,991 | 3/1972 | Gaon | 179/100.1 C |
| 3,708,632 | 1/1973 | Parilla | 179/100.1 C |
| 3,825,947 | 7/1974 | Rubin et al. | 360/12 |
| 3,831,190 | 8/1974 | Ward | 360/12 |
| 3,858,195 | 12/1974 | Gregg, Jr. et al. | 360/12 |
| 3,877,363 | 4/1975 | Parilla | 179/100.1 C |
| 3,889,290 | 6/1975 | Seaton | 179/100.1 C |
| 3,909,842 | 9/1975 | Noji | 179/100.1 C |
| 4,002,858 | 1/1977 | Giese | 179/100.1 PS |
| 4,014,039 | 3/1977 | Yasunaga | 179/100.1 VC |
| 4,032,712 | 6/1977 | Catto et al. | 179/100.1 VC |

*Primary Examiner*—Raymond F. Cardillo, Jr.
*Attorney, Agent, or Firm*—Trask & Britt

[57] ABSTRACT

A plurality of audio message units are each comprised of a control circuit which receives intervaled timing pulses from a clock. The control circuit sends a start signal to a tape player. An audio detect circuit is connected to the audio output of the tape player and supplies a run and stop signal to the player through the control circuit upon the detection of an audio signal at the tape player output and its subsequent termination, respectively. Speakers are connected to the audio output of the tape player of each respective message unit to broadcast audio messages preprogrammed on the tapes of each tape player. A programmer for programming the tapes has a tape recorder with a microphone and a digital clock with means to set and incrementally advance displayed time to the time a particular message is to be broadcast by a particular audio message unit. The system may include a security message unit to broadcast audio messages reflecting the existence of a security violation. Each message unit may also include an automatic rewind circuit.

15 Claims, 11 Drawing Figures

AUDIO MESSAGE SYSTEM WITH PROGRAMMER

BACKGROUND OF THE INVENTION

1. Field

The invention relates to preprogrammed audio message systems. In particular, this invention provides for an audio message system for broadcasting messages at timed intervals and a programmer for programming the messages onto tape.

2. State of the Art

A variety of message systems which broadcast audio (ie., human voice) messages are known. For example, U.S. Pat. Nos. 3,647,991 (Gaon et al); 3,825,947 (Rubin et al); and 3,889,290 (Seaton) each disclose systems for broadcasting audio messages in sequence at regular intervals. Such systems, however, are of limited use because they do not permit broadcasting to different audiences in a selected environment, do not allow broadcasting at irregular time intervals, and/or do not provide a ready means to program the messages to be broadcast. Further, some systems (e.g., U.S. Pat. Nos. 3,644,682; 3,708,632; and 3,877,363 all to Parilla) require synchronization with local time and rely on mechanical means to maintain synchronization and/or terminate messages.

Other systems are of limited use and deliver preprogrammed messages which are not readily changed or reprogrammed. For example, U.S. Pat. No. 2,804,501 (Hart).

Other related systems which may be of interest are U.S. Pat. No. 3,015,702 (Vogel et al); U.S. Pat. No. 3,858,195 (Gregg, Jr. et al); U.S. Pat. No. 3,493,681 (Richards); and U.S. Pat. No. 3,909,842 (Noji).

SUMMARY OF THE INVENTION

A programmable audio message system includes a clock, a plurality of audio message units, and speakers associated with each audio message units. The audio message units have a control circuit which is conductively connected to receive intervaled timing pulses from the clock and supply a start control signal to a tape player. An audio detect circuit is conductively connected to the audio output of the tape player to detect the presence of an audio signal and supply a run (audio present) and stop (audio present) signal to the tape player through the control circuit. Tapes for each of the respective audio message units are preprogrammed with the plurality of messages and are positioned on the tape players of each of the respective audio message units.

The tapes for each of the audio message units may be programmed with a programmer having a tape recorder, digital time display means and a control means. The control means has a counter control circuit conductively connected to the time display means to supply signals to cause the time display means to display and index preselected times. The control means also has an audio monitor circuit conductively connected to detect the presence and absence of an audio input through a microphone associated with the tape recorder. The audio monitor circuit sends pulsing signals to the counter control circuit to cause the time displayed to advance a preselected increment after detecting the presence of an audio input of a selected duration followed by the absence of an audio input. The audio monitor circuit has means to inhibit recording for a selected period after detection of the absence of an audio input into the tape recorder.

In a preferred embodiment, the counter control circuit includes a manually operable set switch conductively connected to supply a set signal to cause a preselected time to be set into the time display means and to be thereby displayed. The counter control circuit may also include a manually operable pulse switch conductively connected to supply a pulse signal to cause the time display means to advance the display time of a preselected incremented time. The audio monitor circuit preferably includes means to visually indicate enablement to receive audio signals after the inhibited period caused by the audio monitor circuit. The digital time display means may also include a selector switch conductively connected to add or subtract a preselected time increment to the displayed time. A unit advance switch may also be provided to supply a short audio tone to the input of the programmer tape recorder. The tone is of sufficient duration to allow the audio mount or circuit to advance the preselected increment of time.

In a highly preferred embodiment, a first audio message unit is conductively connected to speakers positioned to broadcast to customers at a point of sale location and a second audio message unit with speakers positioned to broadcast to the employees proximate a point of sale location but remote from the vicinity of the customers. The second audio message unit preferably includes a delay circuit conductively connected to the control circuit to supply signals to delay operation of the second audio message unit for preselected period of time after the receipt of interval timing pulses from the clock. The delay is less than the magnitude of the interval of said pulses. A rewind circuit may also be provided to receive intervaled timing pulses from the clock to cause the tapes to rewind at the completion of a specified preselected period of time.

In another embodiment, a security system is included which has detection circuits positioned to detect security indicia and transmit security signals indicative thereof to a security control circuit which is conductively connected to receive the security signals and generate a start signal to start a security tape player. The tape player has an output conductively connected to speaker means to broadcast an audio message prerecorded on a tape positioned on the security tape player.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
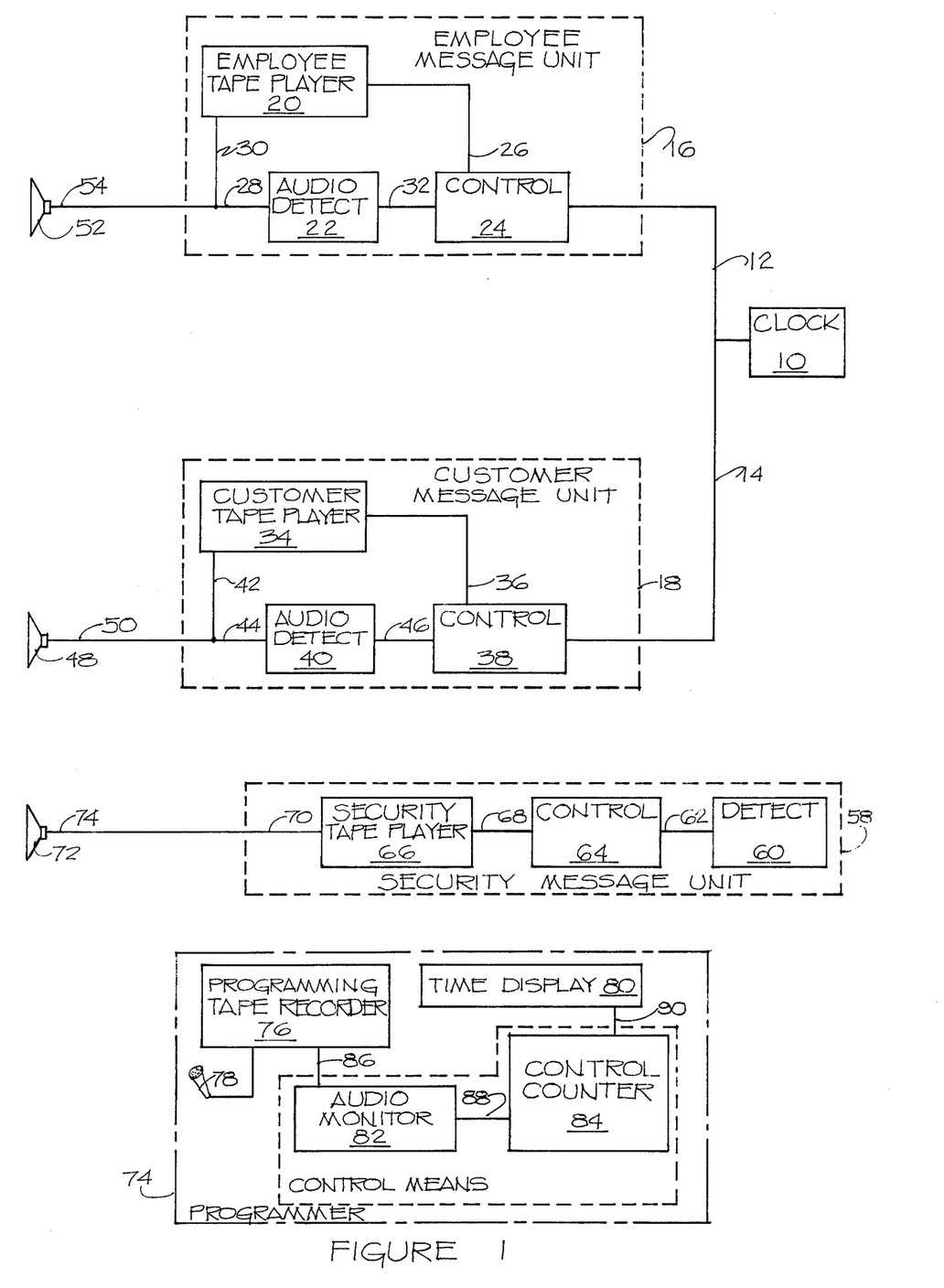
FIG. 1 is a simplified block diagram of an audio message system of the instant invention.

FIG. 1 depicts audio message units with a programmer in simplified format. In particular, FIG. 1 illustrates a clock 10 conductively connected by conductors 12 and 14 to a first or employee audio message unit 16 and a second or customer audio message unit 18. The employee message unit 16 includes an employee tape deck 20, an audio detect circuit 22 and a control circuit 24. The control circuit 24 is conductively connected by conductor 26 to the employee tape player 20. The audio detect circuit 22 is conductively connected by conductor 28 to the output 30 of the employee tape player and by conductor 32 to the control circuit 24.

Similarly, the customer message unit 18 has a tape player 34 conductively connected by conductor 36 to the control circuit 38. It also has an audio detect circuit 40 conductively connected to the output 42 of the tape deck 34 by conductor 44. The audio detect circuit 40 is conductively connected to the control circuit 38 by conductor 46. The customer message unit 18 also has a speaker 48 associated therewith connected by conductor 50 to the output 42 of the customer tape player 34. Similarly, the employee message unit 16 has a speaker 52 associated therewith conductively connected to the employee tape deck 20 by conductor 54. The speakers 48 and 52 are positioned preferably to be heard by different audiences in a particular selected environment as set forth hereinafter. The speakers 48 and 52 are conventional devices to convert electrical audio pulses to audible sound.

FIG. 1 also depicts a security message unit which includes a detect circuit 60 conductively connected by conductor 62 to a control circuit 64. The control circuit 64 supplies security control signals to a security tape player 66 via conductor 68. The output of the security tape player 70 is supplied to a speaker 71 via conductor 72. The speaker 71 is positioned as desired by the user to broadcast to a very selected or limited audience as discussed hereinafter.

Also illustrated in FIG. 1, is the programmer unit 74. The programmer unit 74 is comprised of a programming tape recorder 76 having a microphone input 78 associated therewith. The programmer 74 also includes a digital time display 80, an audio monitor circuit 82 and a counter control circuit 84. The audio monitor circuit 82 is conductively connected to the programming tape recorder 76 by conductor 86 to detect the presence of an audio input through the microphone 78 to the programming tape recorder 76. The audio monitor 82 supplies a signal to the counter control 84 via conductor 88. The counter control 84 supplies signals to control the time display 80 via conductor 90.

Figure 3:
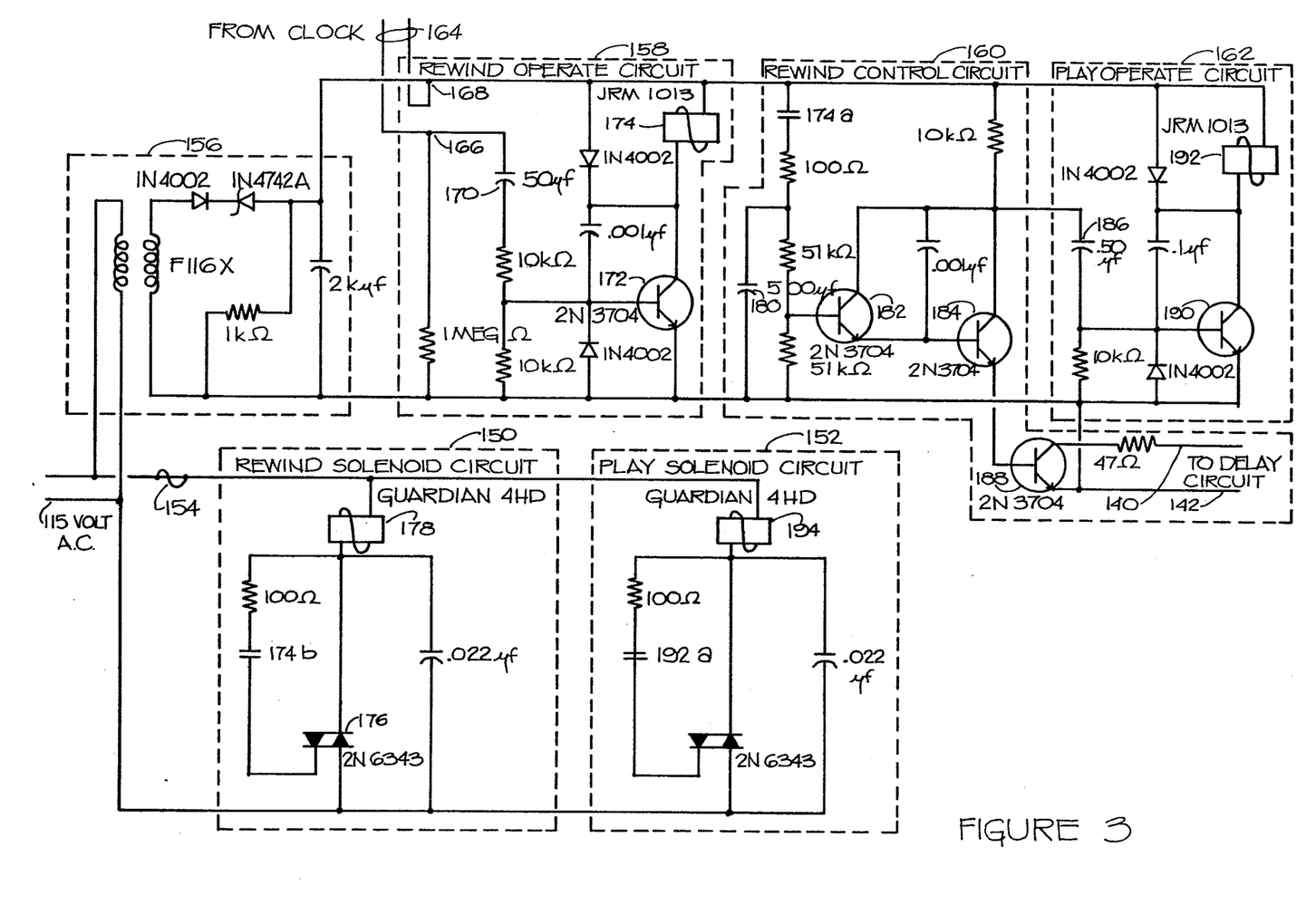
FIG. 3 is a circuit diagram of a rewind circuit of the instant invention.
Figure 11:
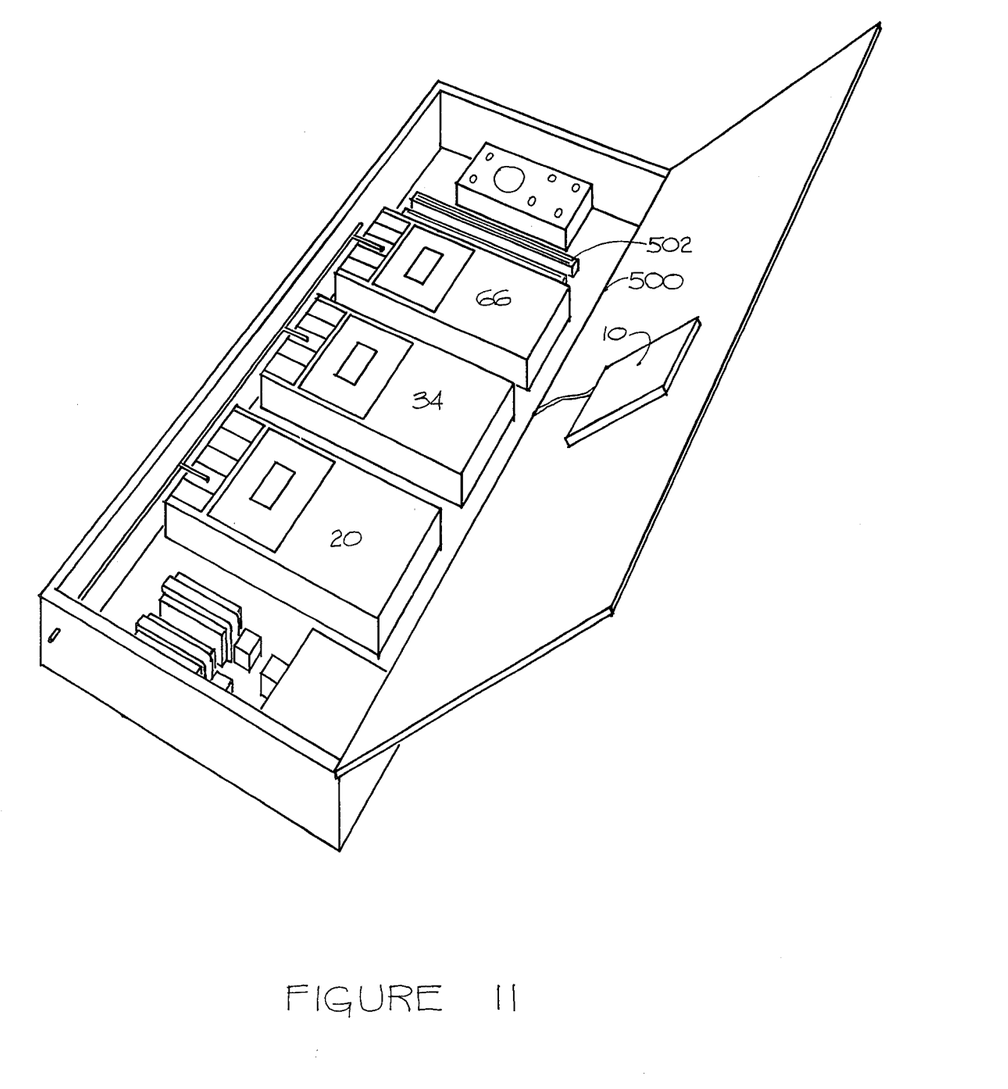
FIG. 11 is a perspective view of a chassis containing audio message units of the instant invention.

The clock 10 shown in FIG. 3 and FIG. 11 is a conventional Sankyo Model 501, 24-hour digital clock having two sets of mechanical contacts. One set closes momentarily every ten minutes. The other set closes momentarily every 24 hours to send a rewind pulse discussed hereinafter.

Figure 8:
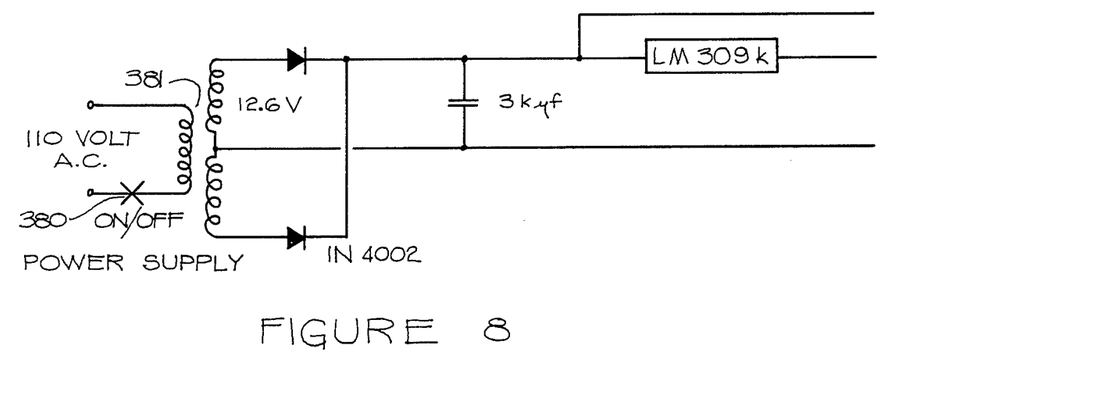
FIG. 8 is a circuit diagram of a power supply suitable for use with the circuits of FIGS. 5 through 7.

The tape players 20, 34 and 66 and the recorder 76 shown in FIG. 1 are preferably conventional cassette tape machines of the same make and model to facilitate maintenance and simplify operations. For the embodiment illustrated a Sankyo ST-200 tape machine is preferred which is generally illustrated in FIG. 8.

Figure 2:
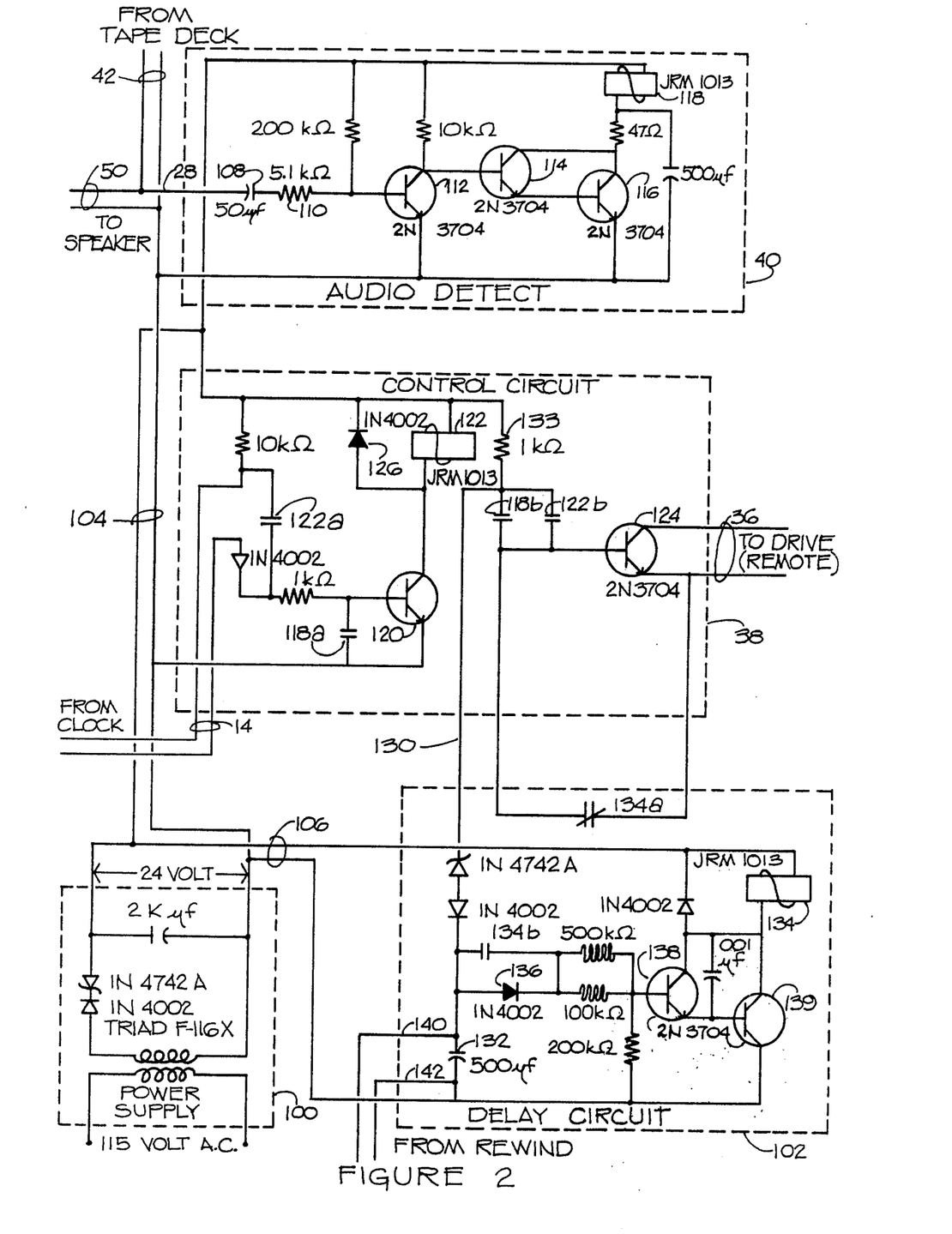
FIG. 2 is a circuit diagram of the audio detect circuit and control circuit with a delay circuit of a message unit of the instant invention.

Referring now to FIG. 2, a practical audio detect circuit 40 and control circuit 38 are illustrated along with a power supply 100 and delay circuit 102 for use with the customer message unit 18. It should be understood that the audio detect circuit 40 and the control circuit 38, as illustrated in FIG. 2, may be used as the audio detect circuit 22 and control circuit 24 of the employee message unit 16 or any other of a plurality of message units cooperatively combined as set forth under the principles and teachings of the instant invention.

Referring now to the details of FIG. 2, the power supply 100 receives input power from an exterior source (not shown) which is a conventional source of AC power such as outlet power (110-120 volts AC). The power supply 100 in turn supplies a 24 volt signal to the control circuit 38 and audio detect circuit 40 over conductors 104 and to the delay circuit 102 over conductors 106. The power supply 100 here illustrated is a conventional 24 volt power supply.

The audio detect circuit 40 as hereinbefore stated is conductively connected to the output 42 of the tape deck 34 by conductor 42. When an audio signal is present at the output 42, its presence is detected through capacitor 108 and resistor 110 to cause transistor 112 to fire. In turn, transistors 114 and 116 operate to cause the solenoid relay 118 to operate. The contacts of relay 118 are located in the control circuit 38 and constitute in effect a conductive connection to send a signal thereto indicating the presence of an audio signal at the output 42 of the tape deck 34. It should be noted that the capacitor 108 acts as a smoothing capacitor for the signal into the base of transistor 112 so that transistor 112 remains fired even though there may be minor gaps or absences of audio on the output from the tape deck 20 which normally arise in speech. The value of capacitor 108 is such that gaps of up to one second may be tolerated without the transistor 112 resetting. Of course, as a result, when the audio message is completed the solenoid relay 118 will remain activated for about one second thereafter.

The control circuit 38 receives an input from the clock 10 via conductor 14. The input is a pulse which causes transistor 120 to fire. As a result, solenoid relay 122 operates to close its respective contacts 122a and 122b. Contacts 122a in effect cause relay 122 to lock across itself and remain energized after the pulse from the clock 10 is terminated. When contact 122b closes, transistor 124 fires and sends a start and drive signal to the tape player 34 via conductor 36. Once the tape player 34 starts, the audio message present at the output 42 of the tape player 34 will be detected and relay 118 of the audio detect circuit 40 will operate its contacts 118a and 118b in the control circuit 38. Contact 118a shorts the base of transistor 120 causing it to return to a nonconducting state. In turn, relay 122 deactivates causing its respective contacts 122a and 122b to open. However, parallel contact 118b is closed continuing the signal to transistor 124 and in turn causing the drive (run) signal to the tape player 34 to continue uninterrupted.

In the instant embodiment, it is desired that the first or employee unit message 16 operate at a particular evenly spaced interval and that the customer message unit operate at a similar evenly spaced interval, but at times different from that of the first or employee message unit 16. As presently contemplated, the employee message unit 16 operates at the hour and every ten minute period thereafter. The customer message unit 18 operates at five minutes after the hour and every ten minute period thereafter. In order to effect the spacing, a delay circuit 102 is provided to delay operation of the control circuit 38 after receipt of a timing pulse from the clock 10 which would start the employee or first message unit 16. That is, the delay circuit of FIG. 2 is adapted to the customer message unit 18 to cause it to operate approximately five minutes after the employee message unit 16 has operated.

The delay circuit 102 of FIG. 2 receives an input power signal from the control circuit 38 via conductor 130 to cause the capacitor 132 to charge. Resistor 133 in the control circuit 38 controls the charge on capacitor 133 and limits it to about 12 volts. The contact 134a of the normally energized solenoid relay 134 in the delay circuit 102 is closed causing a short across the emitter and base of transistor 124 in the control circuit 38. Accordingly, when relay 122 in the control circuit 38 and in turn its contacts 122b close to send a drive signal to the tape player 34, the drive signal is defeated by the short across the base and emitter of transistor 24. When relay 122 operates upon command from the clock 10, no audio is detected because contact 134a is defeating the drive signal. Capacitor 132 however, begins to discharge. After about 5 minutes, it has discharged enough so that the current through contacts 134b and diode 136 is diminished sufficiently to cause transistors 138 and 139 to de-energize. In turn, relay 134 de-energizes removing the short across transistor 124 in the control circuit 38 and in turn allowing the drive signal to be sent to the tape player 34. When the audio is detected at the output 42 of tape player 34, relay 118 operates as before discussed. With contact 118b closed, insufficient voltage is available to recharge capacitor 132 until the audio stops and relay 118 deactivates. It may also be noted that the delay circuit 102 receives an input from the rewind circuit via conductors 140 and 142 to defeat the delay imposed by the circuit 102 so that a drive signal to rewind the tape on the tape player 34 can be passed through to the tape player 34.

Referring now to FIG. 3, a rewind circuit is illustrated for use with an audio message unit of the instant invention. The rewind circuit as here illustrated receives conventional AC outlet power (110–120 volt AC) from an external source. The power is supplied to a rewind solenoid circuit 150 and a play solenoid circuit 152 through a conventional two ampere fuse 154. The power is also supplied to a conventional 24 volt power supply 156 which supplies power to a rewind operate circuit 158, a rewind control circuit 160 and a play operate circuit 162. The rewind operate circuit 158 receives a pulse signal from the clock 10 via conductors 164. The pulse signal in effect causes a closed circuit condition to appear across nodes 166 and 168 so that capacitor 170 may discharge and in turn fire transistor 172. In firing, transistor 172 causes solenoid 174 to operate and close its respective contacts 174a in the rewind control circuit 160 and 174b in the rewind solenoid circuit 150. Contact 174b shorts the gate of thyristor 176 and in turn activates the rewind solenoid 178. The rewind solenoid 178 has contacts not shown in the drive circuit of the tape players 20 (34) of each audio message unit to cause the drive system of that particular tape player to drive its tape backwards (i.e., rewind) in a conventional manner. Contact 174a closes upon the operation of relay 174 to allow capacitor 180 in the rewind control circuit 160 to charge. Upon being charged, the capacitor 180 discharges through transistors 182 and 184 to prevent the capacitor 186 from discharging. At the same time transistor 188 is fired sending a signal to the delay circuit 102 (FIG. 2) to bypass the delay imposed by the delay circuit 102. For standard cassette tapes, it takes less than one minute to rewind. The value of the capacitor 180 is selected so that after about one minute capacitor 186 discharges through transistor 190 to activate the play relay 192. The play relay 192 closes its associated contacts 192a in the play solenoid circuit 152 to cause the play solenoid 194 to operate and close contacts (not shown) to operate means in the tape players 20 and 34 of the audio message units 16 and 18 which place the tape players 20 and 34 in a condition for play. When the capacitor 186 is discharged, transistor 190 becomes inoperative. In turn, the play relay 192 deactivates and its respective contact 192a opens. Similarly, the rewind relay 174 ceases to operate upon the complete discharge of capacitor 170 through transistor 172. In turn, its respective contacts 174a and 174b open, removing the short to the delay circuit 102 through conductors 140 and 142 and deactivating the rewind solenoid 178.

Figure 4:
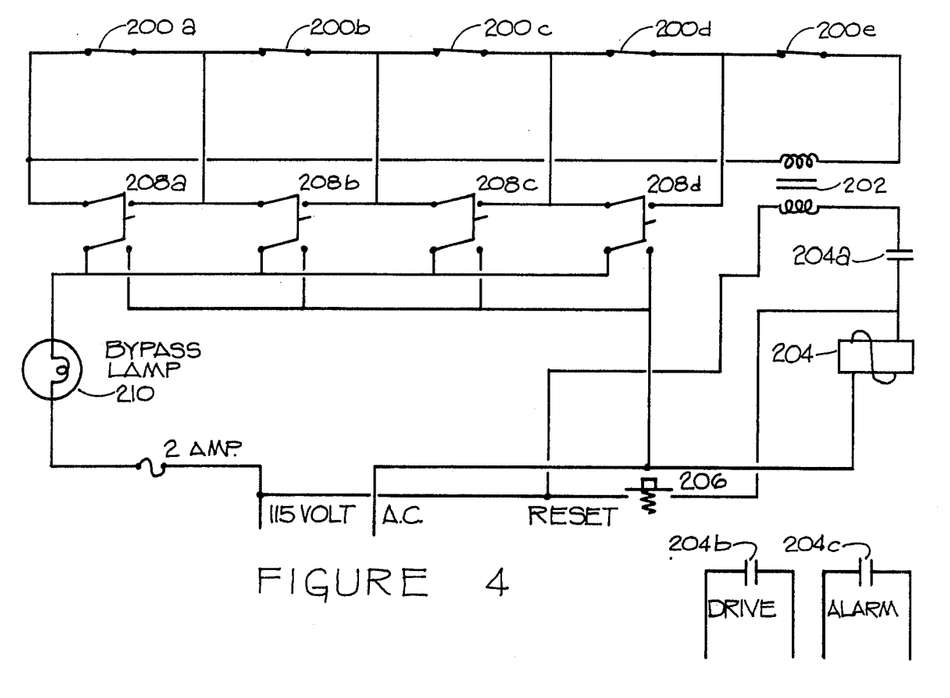
FIG. 4 is a circuit diagram of detect and control circuitry of a security message unit of the instant invention.

FIG. 4 illustrates detect and control circuitry for the security message unit 58. In particular, a plurality of series contacts 200a, 200b, 200c, 200d and 200e are shown connected to the secondary of a transformer 202. A relay 204 is powered from an external source which is preferably 110–120 volt AC. The relay 204 is normally energized with its contact 204a closed and its other contacts 204b and 204c open. When one of the series switches 200a–e opens, there is a break in the circuit comprised of the switches 200a–e and the secondary of the transformer 202. The break causes the reflected impedance of the transformer 202 to change. The resulting change in current causes relay 204 to deenergize and open its contacts 204a and close its contacts 204b and 204c. The contacts 204b are to the drive of the security tape player 66. Contacts 204c are to an independent and not shown audible alarm optional to the user. To reset the security system, the reset button 206 is pushed to make a circuit across the relay 204. In turn, it energizes and closes its respective contact 204a and opens its respective contacts 204b and 204c. The circuit as illustrated also includes a series of bypass switches 208a, 208b, 208c and 208d. The switches 208 are single-throw double-pole switches. When closed they cause a short across its corresponding detection switch 200a, 200b, 200c or 200d and also cause a completed circuit to be made across the bypass lamp 210 thereby illuminating it. It should be noted that each of the detection switches 200a–e may be any kind of switch means positioned to detect a particular security indicia. For example, a switch may be positioned to indicate an open door or open window. That is, upon opening a door or a window, the switch opens to cause the security system to activate. It may further be noted that switch 200e does not have a bypass switch associated with it to indicate that some security switches may be wired to be incapable of bypass.

Figure 5:
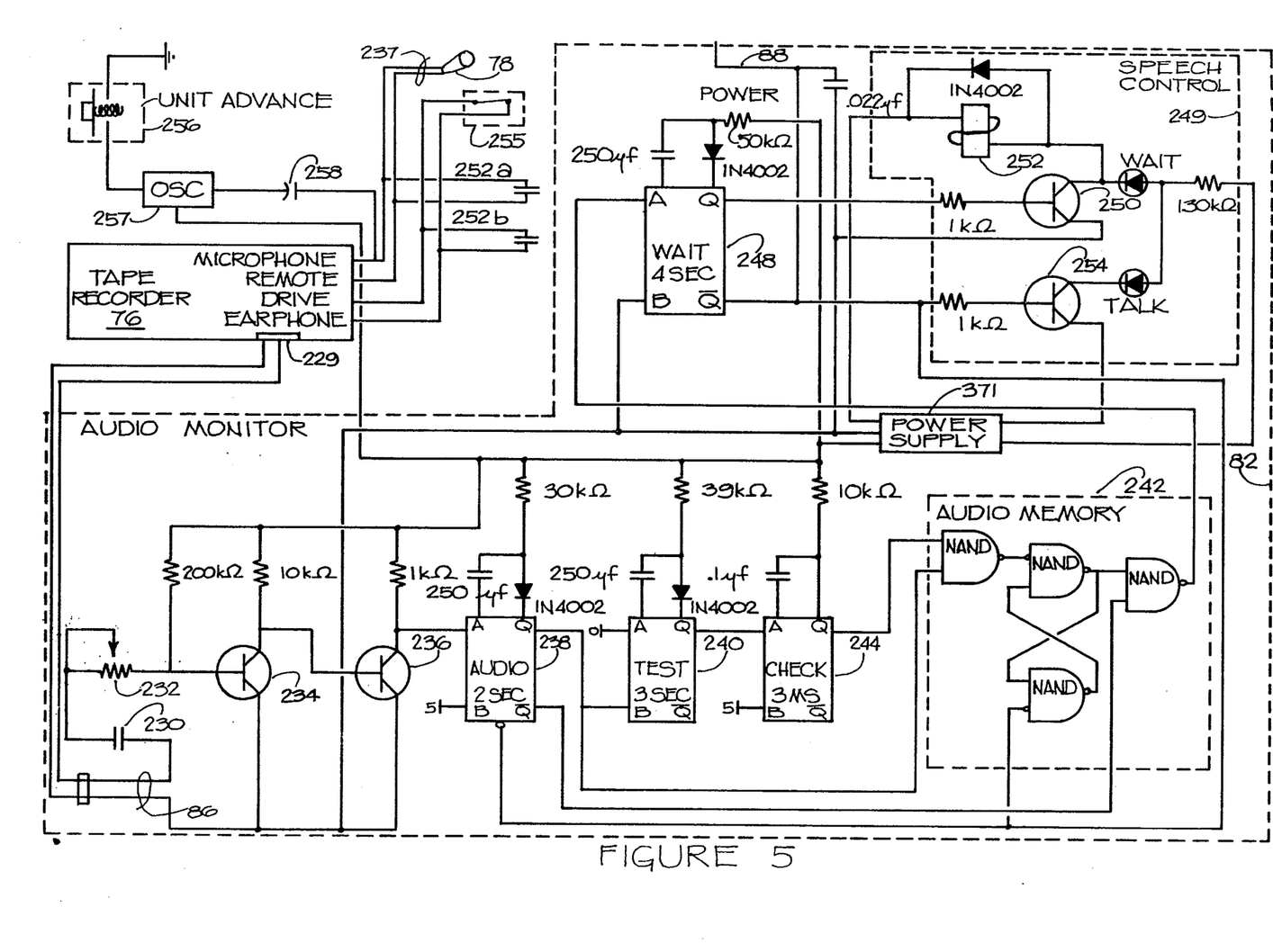
FIG. 5 is a circuit diagram of an audio monitor circuit of a programmer of the instant invention.

Referring now to FIG. 5, a practical audio monitor circuit 82 is illustrated. The audio monitor 82 receives an input from an audio output 229 (earphone jack) of the programming tape recorder 76 via conductor 86. The output passes through a smoothing capacitor 230 and an adjusting resistor 232. The adjusting resistor 232 is used to adjust the level of the input into transistors 234 and 236 to prevent intermittent operation because of a fluctuating level of audio at the input 237 into the programming tape recorder 76. When an audio signal is present at the input 237 of the programming tape recorder 76, transistors 234 and 236 fire the audio one-shot 238. The transistors 234 and 236 will not fire until the audio is present at the input 237 of the programming tape recorder 76 for at least about one second. Accordingly, intermittent or spurious audio signals (e.g., static) will not cause the programmer 74 to cycle as if a full message unit had been recorded as more fully discussed hereinafter. Upon firing, the audio one-shot 238 sends an output to the test one-shot 240 and to the audio memory circuit 242. The test one shot 240 supplies an output to a check one shot 244 which in turn supplies an output to the memory circuit 242.

In operation, audio signals hold the audio one shot 238 in an "on" condition as long as they are present. The audio one shot 238 remains "on" for about two seconds after the audio disappears to avoid spurious on-off cycles due to the variable audio in normal speech patterns, and to contribute to a five second break between audio message units. The audio one shot 238 cycles the test one shot 240 which tests for an output from the audio one-shot 238 and adds about a 3 second additional delay to the two second delay of the audio one-shot 238. The test one-shot 240 also operates the check one-shot 244 to operate the audio memory circuit 242. When the test one shot 240 releases, the check one shot 244 sets the audio memory circuit 242 for the next audio message unit. About two seconds after audio ceases, the output of the audio memory circuit 242 cycles the wait one shot 248 which holds the audio one shot 238 in an "off" condition to prevent audio from interrupting a wait cycle and ensure the presence of a five second gap between audio message units. The wait one-shot 248 operates the speech control circuit 249 which includes the wait light emitting diode (LED) 250. The wait relay 252 and talk LED 251. During the wait cycle, the wait LED 250 is illuminated to visually warn the user to wait. Further, during the wait cycle, relay 252 is activated or actuated. In turn, its contacts 252a and 252b operate. Contact 252a shorts the microphone input so that audio cannot be recorded during the wait cycle. Contact 252b shorts the drive signal so that the recorder 76 cannot be accidentally shut off to defeat the wait cycle. That is, the recorder 76 continues to drive for the 5 second wait cycle to guarantee a silent 5 second section of tape. When the wait one-shot 248 releases after a period of about five seconds, it sends an output signal to cause the counter control circuit 84 (FIG. 6) to advance the count displayed by the digital time display 80 a preselected amount of time. It should also be noted that upon releasing the wait one-shot 248 also causes the wait LED 250 to extinguish, the relay 252 to deactivate and the talk LED 254 to activate.

FIG. 5 also depicts the audio input circuit of the programmer 74. The microphone 78 receives audio signals (i.e., audio message units) and supplies them to the tape recorder 76 for recording to a conventional manner. A remote drive (on-off) switch 255 supplies a drive signal to the recorder 76 in a conventional manner. The relay contacts 252a and 252b short the audio input 237 and the drive signal to inhibit audio recording (audio message units) during the wait cycle hereinbefore discussed. After the wait cycle is completed, the user may not wish to record a message unit for the particular time displayed. In that event, the unit advance button 256 may be depressed to activate oscillator 257 which in turn supplies an electronic tone of slightly more than one second in duration through capacitor 258 to the recorder input 237. In this way, the audio monitor circuit 82 operates as if an audio message unit has been recorded.

Figure 6:
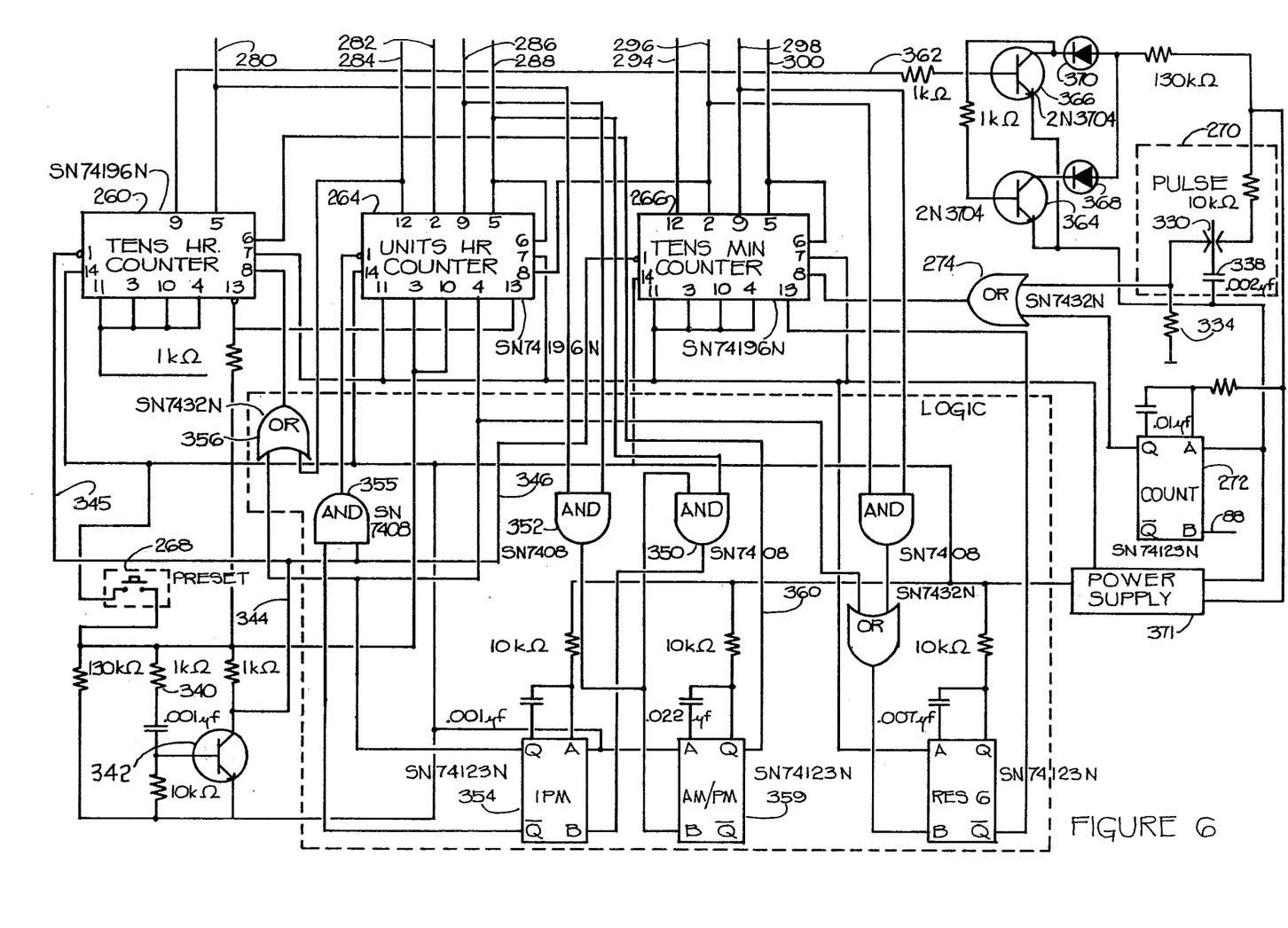
FIG. 6 is a circuit diagram of a counter control circuit of a programmer of the instant invention.

FIG. 6 is a practical circuit diagram of a counter control circuit 84 of the programmer 74 of the instant invention. It includes a tens hour counter 260, a units hour counter 264, and a tens minute counter 266. It also includes a preset switch 268 and a pulse switch 270. The counter control 84 receives an input from the audio monitor circuit 82 via conductor 88. The input is received by the counter one-shot 272 which supplies an output to an 'OR' circuit 274. The 'OR' circuit 274 receives one input from the one shot 272 and another from the pulse switch 270. An input signal from either the pulse switch 270 or the counter one-shot 272 causes the 'OR' 274 to have a positive output which is supplied to the tens minute counter 266. Upon receipt of that signal, the tens minute counter 266 indexes one preset increment (e.g., ten minutes). The logic circuitry 276, in conjunction with the units hour counter 264 and tens hours counter 260, causes the units hour counter 264 and tens hour counter 260 to index in accordance with the hours and minutes of a standard 24 hour cycle.

Figure 7:
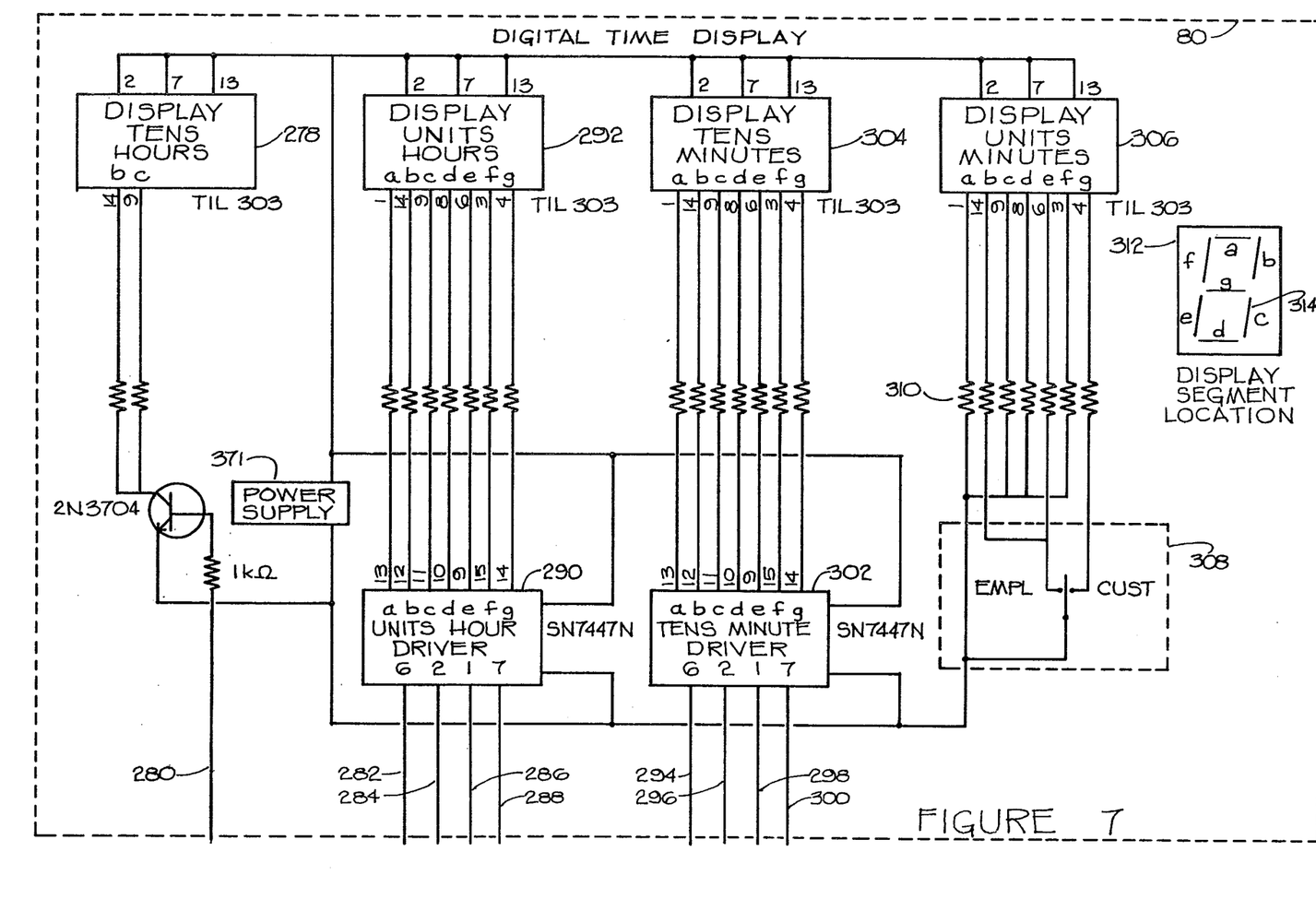
FIG. 7 is a circuit diagram of a time display circuit of a programmer of the instant invention.

The output of the counter control circuit 84 is supplied to the digital time display 80 (FIG. 7). In particular, the output of the tens hour counter 260 is supplied to the tens hour display circuit 278 via conductor 280. The output of the units hour counter 264 is supplied via conductors 282, 284, 286, and 288 to a units hour driver 290 and in turn to a units hour display circuit 292. Similarly, the output of the tens minute counter 266 is supplied via conductors 294, 296, 298 and 300 to a tens minute driver 302 and in turn to a tens minute display circuit 304. The digital time display 80 also has a units minute display circuit 306 which has an employee and customer switch 308 associated therewith. The switch 308 is conductively connected to the units minute display unit 306 through a bank of resistances generally indicated as 310. When the switch 308 is positioned into the employee position, the display segment of the digital time display indicates zero minutes. When the switch is placed in the customer position, the numeral five is displayed for minutes. A display segment is graphically illustrated as item 312. One segment is provided for ten and unit hours and tens and unit minutes. The bars 314 of each segment 312 represent light emitting diodes, nixie tubes or their equivalent which are illuminated by the display circuits 306, 304, 292 and 278, respectively, in a conventional manner. The portions of the numerals are indicated numerically as "a" through "g" with the appropriate terminal symbols associated therewith further illustrated in the display circuits 278, 292, 304 and 306.

Referring back to the counter control circuit 84 (FIG. 6), a pulse switch 270 as hereinbefore stated is conductively connected as an input to the 'OR' circuit 274. When the pulse button 330 is depressed, a preexisting charge on capacitor 332 is carried to resistance 334 in order to send a pulse to the 'OR' circuit 274. The 'OR' circuit 274 thereafter sends a pulse to the tens minute counter 266 to cause the tens minute counter to index a specified interval of time which as hereinbefore set forth is a ten minute interval. The pulse switch 270 is primarily intended for use in maintenance.

The preset switch 268 sends a pulse through the resistor 340 which in turn supplies a signal through the base of transistor 342 to cause transistor 342 to fire. Transistor 342 sends an output signal through conductors 344, 345 and 346 to open all the counters for preset and set in the digits 060 (6:00 o'clock). Other digits may be preset as desired.

In operation, the logic circuitry 276 causes the counter to count as a conventional digital clock. AND gates 350 and 352 test the overall count of the output of the units hour counter 264 for 13. As soon as 13 is reached the afternoon flip-flop 354 cycles to send a count to the tens hour counter 260 through an OR gate 356 to set the counter 260 to zero. The afternoon one shot 354 also sends an output to the AND gate 358 to cause a reset signal to be set into the units hours counter 264 and to cause unity or the number one to appear at its output. The AND gate 350 also tests for an overall count of 12. When the number 12 is reached, the AM/PM one shot 359 cycles to send an output to the tens hours counter 260 via conductor 360. The counter 260 in turn changes its second bit and sends an output via conductor 362 to the AM/PM transistors 364 and 366 respectively. The output of the tens hours counter 260 causes the AM transistor 364 to turn off and the PM transistor 366 to turn on. In turn, the AM light emitting diode 368 ceases to be illuminated; and the light emitting diode 370 is illuminated.

FIG. 8 illustrates a power supply 371 for supplying electrical power to the components of the audio monitor circuit 82, the counter control 84 and the time display circuit 80 (FIGS. 5 through 7). The power supply 371 receives 110–120 volts AC from an external source through a conventional on-off switch 380. The power is supplied to a conventional center tap transformer 381 which has an output of approximately 12.6 volts.

Figure 9:
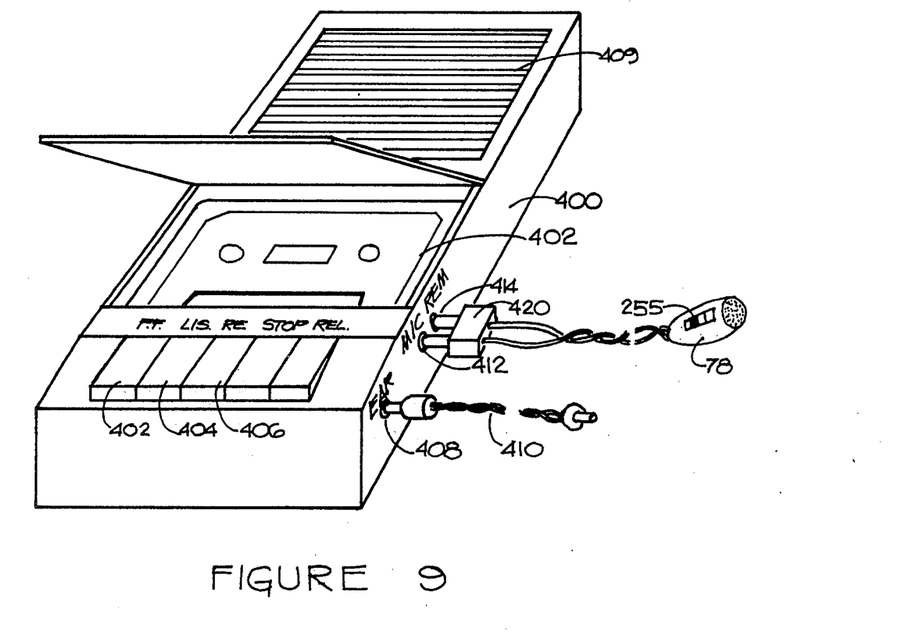
FIG. 9 is a perspective view of a conventional cassette tape recorder of the type usable with the instant invention.

Referring now to FIG. 9, a conventional tape machine of the type which may be used as the employee tape player 20, customer tape player 34, security tape player 66 and programming tape recorder 76 is illustrated. The tape machine illustrated is of the type which uses cassette tapes. In particular, the tape machine 400 has means to receive a conventional cassette cartridge 402. The cassette 402 is positioned within the tape machine 400 to interact with a tape head for recording on and receiving from the tape within the cassette 402 audio messages. The machine 400 has various operating controls such as a fast forward 402, a listen mode 404, a rewind mode 406 and other associated controls. The machine also has a jack or connector 408 for receiving an earphone 410 through which an operator may listen to the audio being processed by the tape recorder. The machine 400 may also have an external speaker 409 built into its chassis to broadcast the audio on the tape 402. The machine also has jacks for a microphone 412 and for a remote start-stop switch 414. As here illustrated, a microphone 78 is adapted to have a remote start-stop switch 255 connected physically thereto and wired so that a combined connector 420 may be used to connect the microphone 78 and remote switch 255 to the tape machine 400. In operation, the remote switch 255 is connected so that the operator may start and stop the tape machine by operating the switch 255 with his finger while holding the microphone 78.

Figure 10:
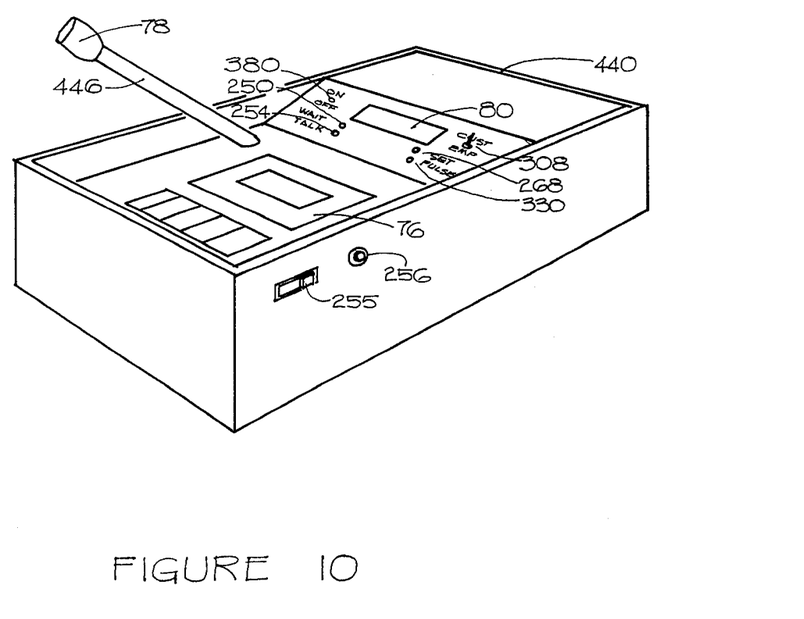
FIG. 10 is a perspective view of a programmer of the instant invention.

Referring now to FIG. 10, a programming unit 74 is illustrated. It is comprised of a chassis 440 and a tape recorder 442 of the type illustrated in FIG. 8. The tape recorder 442 has a microphone 78 associated therewith which is physically attached to a boom 446 that is mounted to the chassis 440 of the programmer 74. The microphone 78 is conductively connected by conductors, as best illustrated in FIGS. 1, 5 and 8, to the programming tape recorder 442 as hereinbefore described. The programmer 74 as here illustrated has a digital time display 80 which is a nixie tube device as hereinbefore discussed and illustrated in FIG. 6. Also illustrated is a preset switch 268 and a pulse switch 94. The customer-employee switch 308 as illustrated in FIG. 7 and is shown here as a conventional toggle switch. The on-off switch for the power supply 380 is also illustrated as a conventional toggle switch. For this programmer 74, the remote drive switch 255 is positioned on the chassis 440, as is the unit advance switch 256.

Referring now to FIG. 11, the message units of the message system of the instant invention are preferably positioned within a single chassis 500. As depicted, the customer message unit 18, employee message unit 16 and security message unti 58 are all positioned within the chassis 500. That is, the chassis 500 contains the tape players 20, 34 and 66 along with their associated conductors and circuitry depicted in FIG. 1 and herein described. The chassis 500 also includes a power distribution and fuse panel 502. The chassis 500 may be positioned on a floor or mounted to a wall as convenient to the user. It is connected to speakers installed throughout the environment as desired by the user. The clock 10 is positioned atop the chassis and will display the correct time in that it is continuously powered and continuously displays the time.

In operation, the user places a cassette tape 402 within the programming tape recorder 76 to program the tape 402 with brief audio messages to be broadcast as hereinafter set forth. In particular, the user determines whether he is going to be making a customer or an employee tape. In making that decision, he selects customer or employee with the customer/employee select switch 308. The customer and employee select switch 308 will cause a zero or a five to be displayed in the units of the time of the digital time display 80. Thereafter, the operator may depress the set switch 268 to cause the digital time display 80 to display a preset time which for the embodiment hereindescribed is 6:00 o'clock A.M. (or 6:05 o'clock A.M.). However, it may indicate 9:00 a.m., 10:00 p.m. or any other time at which messages are to commence. Upon setting the set switch 268, the talk light emitting diode 254 (FIG. 6 and FIG. 10) will be illuminated. Thereupon the user may read a message, preferably from a prepared script, into the microphone 78 which will be recorded by the tape recorder 76 on the tape 402 which is positioned within the recorder 76. Of course the appropriate record buttons of the tape recorder 76 are depressed and the remote switch 255 placed in an on condition. Upon completing the prepared message, which may not exceed 5 minutes in length, the audio monitor circuit 82 detects the absence of an audio input through the microphone 78 and causes the counter control 84 to cycle the digital time display 80 by one interval of time which has been selected to be ten minutes for the disclosed embodiment. That is, the tens minute counter 266 will cause the 10's minute driver 302 and the 10's minute dispaly circuit 304 to advance or index by one unit to display a change in time of 10 minutes. After the wait cycle has been completed by the audio monitor circuit 82, the wait LED 250 extinguishes and the talk LED 254 becomes illuminated so that the operator knows that he may now present the next message which will be broadcast at the particular time indicated in the digital time display 80. The operator may continue to program onto a cassette tape in a similar fashion for an entire period of time within the limitations of the cassette tape.

After preparing or programming tapes 402 for both the customer 18 and employee 16 message units, the tapes 402 are positioned in their respective tape players 22 and 34 to commence operation (play) when their respective message units receive the ten minute timing pulses from the clock 10. The tapes 402 are preferably positioned in their message units at an actual time synchronized to the messages recorder. After the preselected tape playing period has been completed, the rewind contacts of the clock 10 activate (just before 6 o'clock a.m. in this embodiment) to rewind the tapes 402 to align them for replay, it being contemplated that one programmed tape may be used repeatedly without the need to reprogram unless specifically desired.

The security message unit 58 tape 402 may be programmed on the programmer 74 or on a conventional cassette tape recorder. It will contain a simple low key security message such as "There is a security violation; please investigate". Of course, those skilled in the art will recognize that more complex security message unit systems may be substituted for the one herein illustrated and described.

For the instant embodiment, ten minute intervals and a message length of approximately five minutes have been selected for the employee and customer message units so that a tape may be programmed to last an entire business day from approximately 6:00 a.m. until approximately midnight of the same day. In operating the tape, the user may conclude that a message is not desired at a particular time. Upon making the conclusion, after completing a message, the user need only push the unit advance button 256 which will cause the counter control 84 to cycle the digital time display 80 by the preset interval of time (10 minutes) and cause a short one second tone to be recorded as hereinbefore discussed.

It should be noted that the customer/employee switch 308 could be a multi-contact switch to select time at 5, 10, 15 or 20 minute intervals for one to a large number of individual message units to broadcast messages to selected speakers in a particular area of a predetermined environment. For example, messages could be broadcast which would be of interest to stock room people, to retail people, to customers and to office personnel within a large retailing establishment. Similarly, within a fast food chain, two tape decks may be sufficient to broadcast messages into the employee area and into the customer area. The messages into the customer area, which may be regarded as point of sale messages, may be advertising or may be informative and civic minded messages, as desired by the user. Messages to the employees may be directive, educational or as desired by the user.

It should be further noted that the audio message units to be recorded are preferably quite brief (e.g., 1 to 2 minutes). However, they may be of any length not withstanding the ten minute operate cycle because the recorder would continue to operate uninterrupted upon receipt of a timing pulse.

It is to be understood that the embodiments of the invention herein described are merely illustrative of the application of the principles of the invention. Reference herein to details of the illustrated embodiment is not intended to limit the scope of the claims which themselves recite those features regarded as essential for the invention.

We claim:

1. A programmable audio message system comprising:
   a clock to generate intervaled timing pulses;
   a plurality of audio message units, each of said units having:
      control circuit means conductively connected to receive said intervaled timing pulses and to generate a start control signal upon receipt thereof,
      tape player means conductively connected to receive said start control signal, said tape player having means to generate an audio signal and an audio output,
      an audio detect circuit conductively connected
         (1) to the audio output of said tape player to detect the presence of an audio signal and
         (2) to supply a run and stop signal to said tape player through said control circuit to cause said tape player to run as long as an audio signal is present at said audio output,
      tape means for positioning on said tape player, said tape being preprogrammed with a plurality of brief audio messages;
   speaker means associated with each of said audio message units conductively connected to the audio output of its respective tape player to receive audio signals therefrom and generate corresponding audible signals;
   wherein the intervaled timing pulses of said clock cause the control circuit of each message unit to start its respective tape player means in accordance with a time program to play the next brief audio message on said tape and the audio detect circuit of each respective message unit detects (1) the playing of the brief message at the audio output of its respective tape player to cause said tape player to run and (2) the absence of audio signals at the audio output to cause said tape player to stop; and
   wherein said tapes are preprogrammed by a tape programmer comprised of:
      tape recorder means havng an input with a microphone connected thereto to receive an audible input;
      digital time display means;
      control means conductively connected to said tape recorder means and to said digital time display means, said control means having:
         a counter control circuit conductively connected to said time display means to supply signals thereto to cause said time display means to display a preselected time,
         an audio monitor circuit conductively connected to detect the presence and absence of audio input to said tape recorder means and to send a pulsing signal to said counter control to advance the displayed time a preselected increment of time after detection of the presence of an audio input of selected duration followed by the absence of said audio input, said audio monitor circuit having means to inhibit recording for a selected period after the detection of said absence of said audio input.

2. The system of claim 1 further comprising a security message unit having:
   detection circuits positioned to detect security indicia and transmit security signals indicative thereof;
   a security control circuit conductively connected to receive said security signals and generate a start and run control signal;
   security tape player means conductively connected to receive said start and run control signal, said security tape player having means to generate security audio output signal;
   tape means for positioning on said security tape player which is preprogrammed with a plurality of audio messages;
   speaker means conductively connected to receive said security audio output signal and generate corresponding audible signals; and
   wherein said detection circuits send a security signal upon the detection of a security indicia to cause said security tape player to operate and generate said security audio output which is audibly broadcast by said speaker means.

3. The system of claim 1 wherein said counter control circuit includes a manually operable set switch conductively connected to supply a set signal to cause a preselected time to be set into said time display means, a manually operable pulse switch conductively connected to supply a pulse signal to cause said time display means to advance displayed time a preselected increment of time, and a unit advance switch conductively connected to cause an audible tone to be generated and supplied to the tape recorder input, said tone being longer in duration than said selected duration for said audio monitor circuit to send said pulsing signal.

4. The system of claim 3 wherein said audio monitor circuit includes means to visually indicate enablement to receive said audible input after the said inhibited period.

5. The system of claim 4 wherein said digital time display means includes a selector switch to add and subtract a preselected time increment to displayed time.

6. The system of claim 5 having a first audio message unit with speakers positioned to broadcast to customers at a point of sale location and a second audio message unit with speakers positioned to broadcast to the employees proximate a point of sale location.

7. The system of claim 6 wherein said second audio message unit includes a delay circuit conductively connected to said control circuit to supply a signal to delay operation of said second audio message unit for a preselected period of time after receipt of said intervaled timing pulses, said delay being less in magnitude than the interval of said pulses.

8. The system of claim 7 further comprising a rewind circuit conductively connected (1) to said clock to receive a rewind pulse signal therefrom, (2) to said tape players of said first and second audio message units to supply a rewind signal thereto, and (3) to said delay circuit to supply a signal to bypass said delay when said rewind circuit is activated, said rewind circuit sending rewind signals to cause the tape players of said audio message units to rewind their respective tapes upon receipt of said rewind pulse signal from said clock.

9. The system of claim 8 wherein said tape players and said tape recorder are conventional cassette tape machines and wherein said tape means is a conventional cassette tape.

10. Apparatus for programming cassette tapes for use with an audio message system having cassette tape recorders, said apparatus being comprised of:
    a cassette tape recorder having an input with a microphone connected thereto to receive an audible input;
    digital time display means;
    control means conductively connected to said tape recorder means and to said digital time display means, said control means having:
       a counter control circuit conductively connected to said time display means to supply signals thereto to cause said time display means to display a preselected time,
       an audio monitor circuit conductively connected to detect the presence and absence of audio input to said tape recorder means and to send a pulsing signal to said counter control to advance the displayed time a preselected increment of time after detection of the presence of an audio input of selected duration followed by the absence of said audio input, said audio monitor circuit having means to inhibit recording for a selected period after the detection of said absence of said audio input.

11. The apparatus of claim 10 wherein said counter control circuit includes a manually operable set switch conductively connected to supply a set signal to cause a preselected time to be set into said time display means, a manually operable pulse switch conductively connected to supply a pulse signal to cause said time display means to advance displayed time a preselected increment of time, and a unit advance switch conductively connected to cause an audible tone to be generated and supplied to the tape recorder input, said tone being longer in duration than said selected duration for said audio monitor circuit to send said pulsing signal.

12. The apparatus of claim 11 wherein said audio monitor circuit includes means to visually indicate enablement to receive said audible input after the said inhibited period and wherein said digital time display means includes a selector switch to add and subtract a preselected time increment to displayed time.

13. In an audio message system for broadcasting point of sale messages of the type having a clock connected to a tape machine to play timed messages at a preselected interval, the improvement comprising the use of a programmer to program said tapes, said programmer having;
   tape recorder means having an input with a microphone connected thereto to receive an audible input;
   digital time display means;
   control means conductively connected to said tape recorder means and to said digital time display means, said control means having:
      a counter control circuit conductively connected to said time display means to supply signals thereto to cause said time display means to display a preselected time,
      an audio monitor circuit conductively connected to detect the presence and absence of audio input to said tape recorder means and to send a pulsing signal to said counter control to advance the displayed time a preselected increment of time after detection of the presence of an audio input of selected duration followed by the absence of said audio input, said audio monitor circuit having means to inhibit recording for a selected period after the detection of said absence of said audio input.

14. The improvement of claim 13 wherein said counter control circuit includes a manually operable set switch conductively connected to supply a set signal to cause a preselected time to be set into said time display means, a manually operable pulse switch conductively connected to supply a pulse signal to cause said time display means to advance displayed time a preselected increment of time, and a unit advance switch conductively connected to cause an audible tone to be generated and supplied to the tape recorder input, said tone being longer in duration than said selected duration for said audio monitor circuit to send said pulsing signal.

15. The improvement of claim 14 wherein said audio monitor circuit includes means to visually indicate enablement to receive said audible input after the said inhibited period and wherein said digital time display means includes a selector switch to add and subtract a preselected time increment to displayed time.

* * * * *